United States Patent
Whitworth et al.

(10) Patent No.: US 11,135,824 B2
(45) Date of Patent: Oct. 5, 2021

(54) MULTI-STAGE DEBULK AND COMPACTION OF THICK COMPOSITE REPAIR LAMINATES

(71) Applicant: Textron Innovations Inc., Providence, RI (US)

(72) Inventors: Denver Ray Whitworth, North Richland Hills, TX (US); Vance Newton Cribb, III, Aledo, TX (US); Dumitru Radu Jitariu, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 116 days.

(21) Appl. No.: 16/238,006

(22) Filed: Jan. 2, 2019

(65) Prior Publication Data

US 2019/0134967 A1     May 9, 2019

Related U.S. Application Data

(60) Division of application No. 15/132,328, filed on Apr. 19, 2016, now Pat. No. 10,166,748, which is a division of application No. 13/776,816, filed on Feb. 26, 2013, now Pat. No. 9,314,978, which is a continuation of application No. 12/742,603, filed as
(Continued)

(51) Int. Cl.
| | |
|---|---|
| *B32B 37/10* | (2006.01) |
| *B32B 38/10* | (2006.01) |
| *B32B 43/00* | (2006.01) |
| *B32B 37/06* | (2006.01) |

(Continued)

(52) U.S. Cl.
CPC .......... *B32B 37/1018* (2013.01); *B29C 73/10* (2013.01); *B32B 37/06* (2013.01); *B32B 38/10* (2013.01); *B32B 43/00* (2013.01); *B29C 37/0075* (2013.01); *B32B 2305/72* (2013.01); *B32B 2605/18* (2013.01); *Y10T 428/20* (2015.01)

(58) Field of Classification Search
None
See application file for complete search history.

(56) References Cited

U.S. PATENT DOCUMENTS

| | | |
|---|---|---|
| 4,556,439 A | 12/1985 | Bannink, Jr. |
| 5,116,216 A | 5/1992 | Cochran et al. |
| | (Continued) | |

OTHER PUBLICATIONS

Polybismaleimides (BMI), Polymer Properties Database (Year: 2021).*
(Continued)

*Primary Examiner* — Ramsey Zacharia
(74) *Attorney, Agent, or Firm* — James E. Walton

(57) ABSTRACT

A method for fabricating a repair laminate for a composite part having an exposed surface includes applying a release film to the exposed surface and forming an uncured ply stack assembly on the release film. The uncured ply stack assembly is formed by forming and compacting a series of uncured ply stacks. The release film and ply stack assembly is then removed from the exposed surface. A bonding material is then applied to the exposed surface, and the uncured ply stack assembly is applied to the bonding material. The ply stack assembly and bonding material are then cured.

2 Claims, 2 Drawing Sheets

Related U.S. Application Data application No. PCT/US2008/084969 on Nov. 26, 2008, now Pat. No. 8,382,924.

(60) Provisional application No. 60/990,017, filed on Nov. 26, 2007.

(51) Int. Cl.
*B29C 73/10* (2006.01)
*B29C 37/00* (2006.01)

(56) References Cited

U.S. PATENT DOCUMENTS

| | | | |
|---|---|---|---|
| 5,123,985 A | 6/1992 | Evans et al. |
| 5,145,621 A | 9/1992 | Pratt |
| 5,166,007 A | 11/1992 | Smith et al. |
| 5,492,466 A | 2/1996 | Frailey |
| 5,958,166 A | 9/1999 | Walters et al. |
| 6,149,749 A | 11/2000 | McBroom |
| 6,270,603 B1 | 8/2001 | Westerman et al. |
| 6,391,436 B1 | 5/2002 | Xu et al. |
| 6,991,449 B1 | 1/2006 | Mead et al. |
| 8,382,924 B2 | 2/2013 | Whitworth et al. |
| 10,166,748 B2 | 1/2019 | Whitworth et al. |
| 2001/0054473 A1 | 12/2001 | Chou et al. |
| 2003/0188821 A1 | 10/2003 | Keller et al. |
| 2006/0191624 A1 | 8/2006 | Whitworth |
| 2016/0229171 A1 | 8/2016 | Whitworth et al. |

OTHER PUBLICATIONS

Hearing Notice dated Nov. 18, 2019 from counterpart Indian Application No. 1887/KOLNP/2010.
Chinese Office Action dated Oct. 10, 2012 from counterpart CN App. No. 200880117575.4.
Supplementary European Search Report from corresponding application EP08853357 issued by the European Patent Office dated Aug. 21, 2012. 6 pages.
Canadian Office Action dated May 22, 2012 from counterpart CA application No. 2,705,777.
Office Action from U.S. Appl. No. 12/742,603 dated Feb. 15, 2012.
Amendment from U.S. Appl. No. 12/742,603 dated May 15, 2012.
Office Action from U.S. Appl. No. 12/742,603 dated Jul. 11, 2012.
Amendment from U.S. Appl. No. 12/742,603 dated Sep. 11, 2012.
Advisory Action from U.S. Appl. No. 12/742,603 dated Sep. 25, 2012.
Notice of Allowance from U.S. Appl. No. 12/742,603 dated Nov. 26, 2012.
Chinese Office Action dated Jun. 8, 2013 from counterpart CN App. No. 200880117575.4.
Office Action from U.S. Appl. No. 13/776,816 dated Jun. 3, 2015.
Office Action from U.S. Appl. No. 13/776,816 dated Jan. 29, 2015.
Office Action from U.S. Appl. No. 13/776,816 dated Sep. 23, 2014.
Amendment from U.S. Appl. No. 13/776,816 dated Dec. 23, 2014.
Amendment from U.S. Appl. No. 13/776,816 dated Mar. 30, 2015.
Advisory Action from U.S. Appl. No. 13/776,816 dated Apr. 17, 2015.
Notice of Allowance from U.S. Appl. No. 13/776,816 dated Dec. 15, 2015.
International Search Report from corresponding PCT Application PCT/US08/84969 dated Jan. 15, 2015.
Indian Office Action dated May 26, 2017 from counterpart IN App. No. 1887/KOLNP/2010.
Restriction Requirement dated Jul. 3, 2017 from corresponding U.S. Appl. No. 15/132,328.
Advisory Action dated Jun. 25, 2018 from corresponding U.S. Appl. No. 15/132,328.
Final Office Action dated Apr. 10, 2018 from corresponding U.S. Appl. No. 15/132,328.
Amendment After Final dated Jun. 11, 2018 from corresponding U.S. Appl. No. 15/132,328.
Notice of Allowance dated Aug. 27, 2018 from corresponding U.S. Appl. No. 15/132,328.
Amendment dated Feb. 20, 2018 from corresponding U.S. Appl. No. 15/132,328.
Response to Restriction Requirement dated Oct. 3, 2017 from corresponding U.S. Appl. No. 15/132,328.

\* cited by examiner

MULTI-STAGE DEBULK AND COMPACTION OF THICK COMPOSITE REPAIR LAMINATES

This application is a divisional of U.S. patent application Ser. No. 15/132,328 filed 19 Apr. 2016, titled "MULTI-STAGE DEBULK AND COMPACTION OF THICK COMPOSITE REPAIR LAMINATES", which is a divisional of U.S. patent application Ser. No. 13/776,816 filed 26 Feb. 2013, titled "MULTI-STAGE DEBULK AND COMPACTION OF THICK COMPOSITE REPAIR LAMINATES", which is a continuation of U.S. patent application Ser. No. 12/742,603 filed 12 May 2010, titled "MULTI-STAGE DEBULK AND COMPACTION OF THICK COMPOSITE REPAIR LAMINATES," which is a 371 of P.C.T. Application PCT/US2008/084969 filed 26 Nov. 2008, titled "MULTI-STAGE DEBULK AND COMPACTION OF THICK COMPOSITE REPAIR LAMINATES;" which claims the benefit of U.S. Provisional Patent Application No. 60/990,017 filed 26 Nov. 2007, titled "MULTI-STAGE DEBULK AND COMPACTION OF THICK COMPOSITE REPAIR LAMINATES;" all of which are hereby incorporated by reference for all purposes as if fully set forth herein.

BACKGROUND

1. Field of the Invention

The present invention relates to methods of fabricating laminates made from polymeric-matrix composite materials.

2. Description of Related Art

Parts made from polymeric-matrix composite materials form many components in modern automotive, aeronautical, and marine vehicles, as well as components in many other types of equipment and structures. Such parts may, from time to time, become damaged, thus requiring repair or replacement. It is often required or at least more cost effective to repair a damaged part than to replace the part. Conventional methods of repairing polymeric-matrix composite parts require the use of specialized tooling and double vacuum tool/processes, which require multiple staging operations and cure cycles, or specialized lay-up tools and autoclave processing, which is expensive and often impractical when used to facilitate a repair.

There are many ways to repair damaged polymeric-matrix composite parts that are well known in the art; however, considerable shortcomings remain.

DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein.

Figure 1:
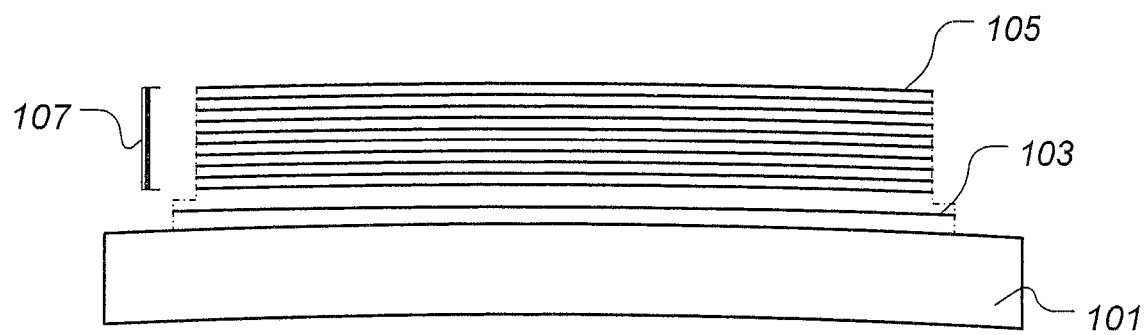
FIG. 1 is an elevated side view of uncured plies applied to a composite part according to the method of the present application.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a method for multi-stage debulking and compaction of thick composite repair laminates made from one or more polymeric-matrix composite materials. In one embodiment, the method is applied to the repair of an existing composite part. The method provides a composite part meeting the same laminate quality requirements as a thick laminate made using highly-pressurized autoclave processing. For the purposes of this disclosure, the term "thick laminate" means a laminate made from more than about 10 plies of polymeric-matrix composite material.

Referring to FIG. 1 in the drawings, a pre-existing composite part 101 is shown. It should be noted that composite part 101 may be planar or non-planar in form. A layer of release film 103 is applied to composite part 101 and a first plurality of uncured plies 105 (only one labeled in FIG. 1 for clarity) of polymeric-matrix composite material is applied to release film 103. In a preferred embodiment, the number of uncured plies 105 making up the first plurality of uncured plies 105 is no more than about ten plies. The first plurality of uncured plies 105 makes up a first ply stack 107. Uncured plies 105 may comprise "wet lay-up" plies or pre-impregnated, i.e., "pre-preg" plies.

Figure 2:
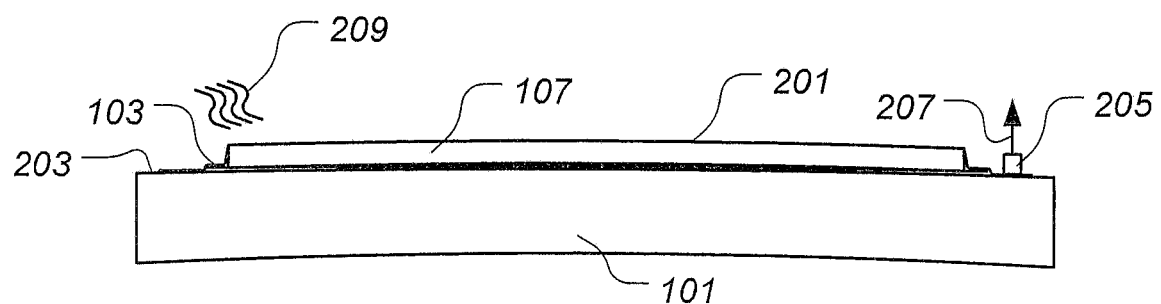
FIG. 2 is an elevated side view of a sealing bag enclosing a ply stack on the composite part according to the method of the present application.

Referring now to FIG. 2, bleeder material (not shown) and a sealing bag 201 is applied over first ply stack 107 and release film 103 in a conventional manner. Sealing bag 201 is attached to an exposed surface 203 of composite part 101 to create a substantially air tight seal between exposed surface 203 and sealing bag 201. A vacuum port 205 extends through sealing bag 201 to allow gases to be withdrawn from sealing bag 201 within the substantially air tight seal between sealing bag 201 and exposed surface 203. A vacuum assembly (not shown) is attached to vacuum port 205, which evacuates gases, as represented by arrow 207, from within the sealed volume of sealing bag 201. In a preferred embodiment, vacuum at a level of two to three inches of mercury is applied to the sealed volume of sealing bag 201. In addition to applying vacuum, a heat source 209 heats at least first ply stack 107 to a desired debulking and compaction temperature. In a preferred embodiment, sufficient heat is applied to first ply stack 107 by heat source 209 to raise the temperature of first ply stack 107 to a temperature of about 125 degrees Fahrenheit. First ply stack 107 is maintained at the desired temperature, e.g., about 125 degrees Fahrenheit, under vacuum, e.g., about one to two inches of mercury, for a time period sufficient to debulk and partially compact first ply stack 107. In a preferred embodiment, first ply stack 107 is maintained at the desired temperature and under vacuum for about one hour. Subsequently, first ply stack 107 is preferably maintained at the desired temperature under full vacuum, e.g., about 28 inches of mercury, for a period of time of about 30 minutes to further compact first ply stack 107. After the desired period of debulking and compaction time, sealing bag 201, the breather material, and any other ancillary processing materials are removed from first ply stack 107 and composite part 101. First ply stack 107 is now debulked and compacted.

It should be noted that the debulking and compaction temperature is a temperature below a curing temperature of the polymer-matrix composite material.

Figure 3:
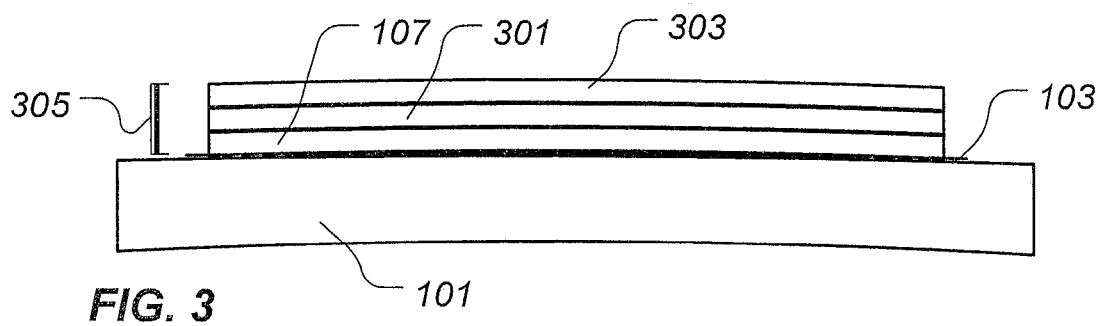
FIG. 3 is an elevated side view of multiple ply stacks on the composite part according to the method of the present application.

Referring now to FIG. 3, a plurality of ply stacks, such as first ply stack 107, a second ply stack 301, and a third ply stack 303, are combined to form a ply stack assembly 305. Ply stack assembly 305 may comprise any suitable, desired number of ply stacks, such as ply stacks 107, 301, and 303. In the illustrated embodiment, second ply stack 301 is formed by applying a plurality of plies, preferably no more than about ten plies, to first ply stack 107. A bag, such as sealing bag 201, is then applied to first ply stack 107 and second ply stack 301. Vacuum and heat are then applied to bagged first ply stack 107 and second ply stack 301 according to the method described herein concerning FIG. 2. Third ply stack 303, as well as any desired ply stacks in addition to third ply stack 303, are formed by the same method as second ply stack 301.

Figure 4:
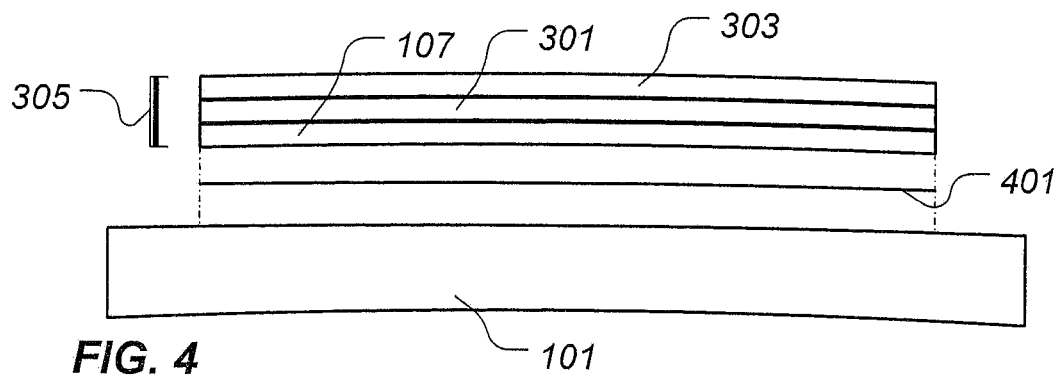
FIG. 4 is an elevated side view of a bonding layer disposed between ply stacks and the composite part according to the method of the present application.

Referring to FIG. 4, release film 103 (shown in FIGS. 1-3) is removed and replaced with a bonding material 401. Bonding material 401 is disposed between ply stack assembly 305 and exposed surface 203 of composite part 101. Note that in this one method of bonding ply stack assembly 305 to exposed surface 203. Bonding material 401 also includes, and is not limited to: a layer of adhesive paste or a layer of adhesive film disposed between ply assembly 305 and exposed surface 203; and/or, adhesive material disposed within ply stack assembly 305.

Figure 5:
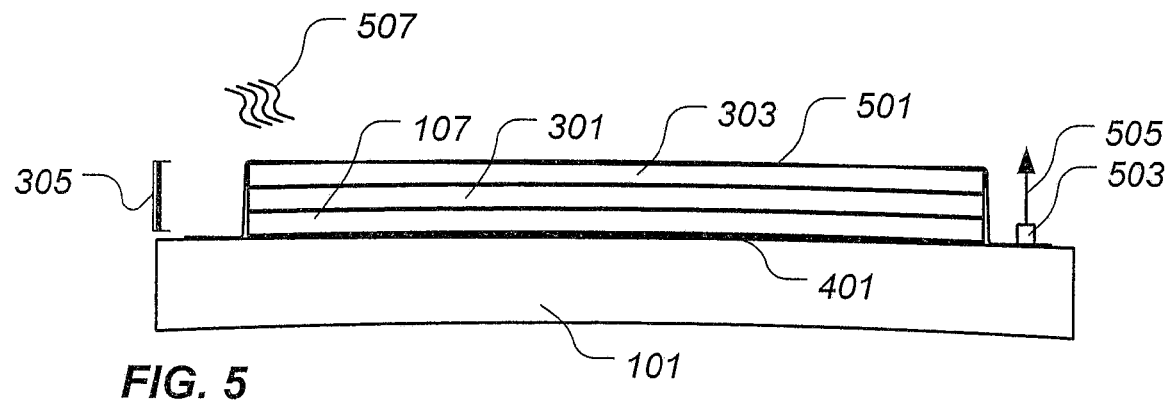
FIG. 5 is an elevated side view of a sealing bag enclosing multiple ply stacks on the composite part according to the method of the present application.
Figure 6:
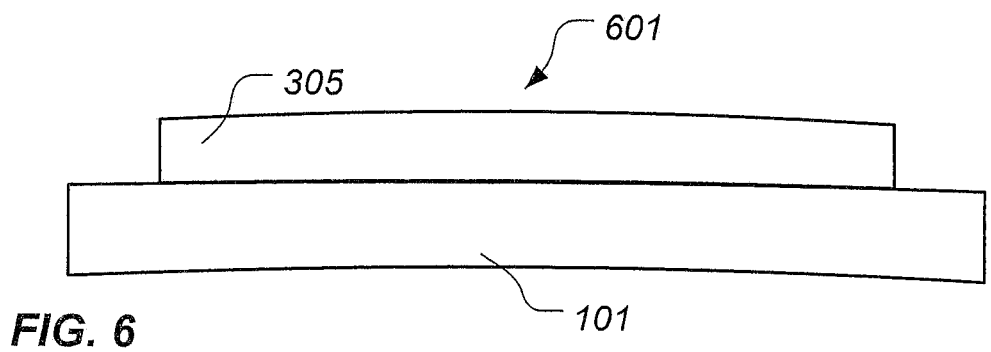
FIG. 6 is an elevated side view of a cured composite layer on the composite part according to the method of the present application.

As depicted in FIG. 5, bleeder material and a sealing bag 501 is applied over ply stack assembly 305 and bonding material 401 in a conventional manner. Sealing bag 501 is attached to exposed surface 203 of composite part 101 to create a substantially air tight seal between exposed surface 203 and sealing bag 501. A vacuum port 503 extends through sealing bag 501 to allow gases to be withdrawn from sealing bag 501 within the substantially air tight seal between sealing bag 501 and exposed surface 203. A vacuum assembly (not shown) is attached to vacuum port 503, which evacuates gases, as represented by arrow 505, from within the sealed volume of sealing bag 501. In a preferred embodiment, full vacuum, e.g., about 28 inches of mercury, is applied to the sealed volume of sealing bag 501. In addition to applying vacuum, a heat source 507 heats at least ply stack assembly 305 to a desired curing temperature, which is dependent upon the particular composite material being used. In one embodiment, sufficient heat is applied to ply stack assembly 305 by heat source 507 to raise the temperature of ply stack assembly 305 to a temperature of about 250 degrees Fahrenheit. Ply stack assembly 305 is maintained at the desired temperature under full vacuum for a time period sufficient to sufficiently cure ply stack assembly 305 and bonding material 401 to form composite laminate 601, shown in FIG. 6. In a preferred embodiment, ply stack assembly 305 is maintained at the desired temperature and under vacuum for about two hours. After the desired curing time, sealing bag 501, the breather material, and any other ancillary processing materials are removed from composite laminate 601, as depicted in FIG. 6. The cured ply stack assembly 305 and the previous composite part 101 now form parts of composite laminate 601, as the cured ply stack assembly 305 is adhesively bonded to the pre-existing form of composite part 101.

It should be noted that the present method may also be applied to the fabrication of a new composite part, rather than to the repair of a composite part. For example, composite part 101 may be replaced with a lay-up tool. Release film 103 is not replaced with bonding material 401 prior to curing ply stack assembly 305, so cured composite laminate 601 can be removed from the lay-up tool.

Figure 7:
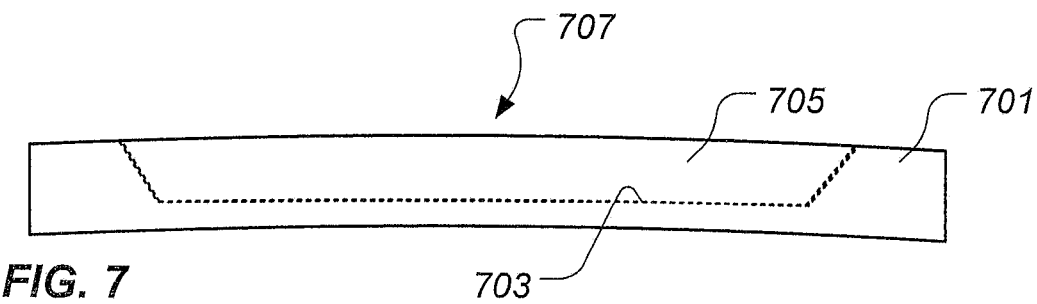
FIG. 7 is an elevated side view of an alternative embodiment of the composite part according to the method of the present application.

It should also be noted that a damaged composite part 701, shown in FIG. 7, may be machined or scarfed to define a recess 703 into which a ply stack assembly 705 is received, cured, and adhesively bonded to composite part 701 to form composite laminate 707.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A repair laminate for a damaged composite part having an exposed surface produced by a process comprising:
   preparing a damaged surface on the exposed surface of the damaged composite part for fabricating the repair laminate thereon;
   applying a release film to the damaged surface;
   forming an uncured ply stack assembly of at least ten total plies that consists of a plurality of uncured ply stacks, the forming of the uncured ply stack assembly including, for each uncured ply stack:
      forming the uncured ply stack over the damaged surface, the ply stack being applied so as to substantially conform to the contouring of the damaged surface, the uncured ply stack consisting of a plurality of uncured plies; and applying a vacuum and heat below a curing temperature to the thus formed uncured ply stack prior to forming another uncured ply stack over the exposed surface;

wherein a first-formed ply stack is applied to contact the release film and the release film contacts the damaged surface;

wherein each subsequently-formed ply stack is applied to a previously-formed ply stack; and wherein at least one of the plurality of uncured ply stacks includes one or more uncured plies comprising polymeric-matrix composite materials;

removing the release film and the uncured ply stack assembly from the damaged composite part;

applying bonding material to the exposed surface;

applying the uncured ply stack assembly to the bonding material on the exposed surface; and curing the uncured ply stack assembly and bonding material;

wherein the first ply stack is compacted prior to the subsequent ply stack being applied and subsequently compacted.

2. The repair laminate according to claim 1, wherein the forming of the uncured ply stack assembly further includes, for each uncured ply stack, at least partially enclosing the uncured ply stack within a sealing bag and attaching the sealing bag to the exposed surface to create an air tight seal around the uncured ply stack.

\* \* \* \* \*